May 18, 1954  E. L. C. WHITE  2,679,002
THERMIONIC CIRCUITS
Filed Feb. 18, 1948
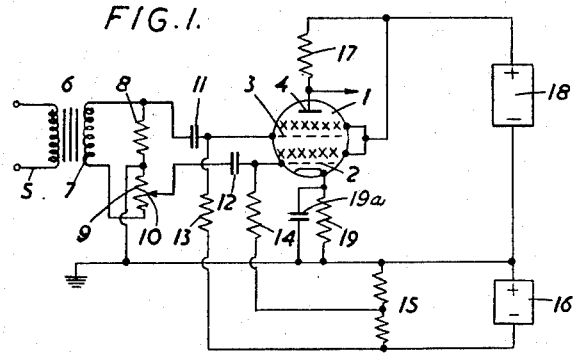
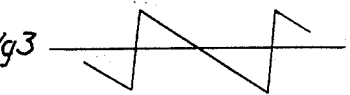
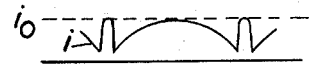
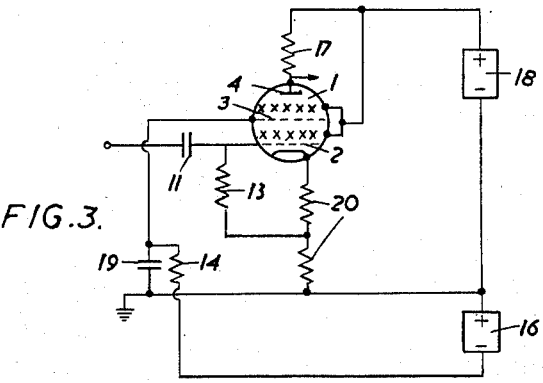
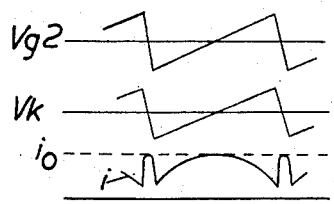
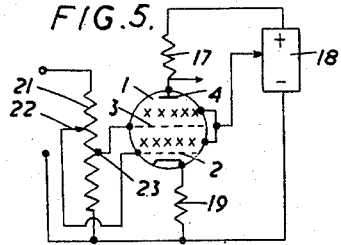
Inventor:
Eric Lawrence Casling White
By *J. O. Ollier*
Attorney Patented May 18, 1954

2,679,002

UNITED STATES PATENT OFFICE 2,679,002

THERMIONIC CIRCUITS

Eric Lawrence Casling White, Iver, England, assignor to Electric & Musical Industries Limited, Hayes, England, a company of Great Britain Application February 18, 1948, Serial No. 9,232

Claims priority, application Great Britain February 19, 1947

2 Claims. (Cl. 250—27)

The present invention relates to thermionic valve circuits.

It is sometimes required to produce a voltage, for instance for use in calculating machines, the instantaneous value of which is proportional to the square of the instantaneous value of an input voltage. It is also required on occasions to produce a voltage the amplitude of which varies from instant to instant in parabolic manner with respect to time. This type of voltage variation is, for instance, required in the so-called "bend correction" circuits used in television transmitters. Furthermore, for some purposes it may be required to provide a voltage consisting of a sawtooth component and a parabolic component.

The object of the present invention is to provide an improved circuit for generating such a voltage.

According to the present invention there is provided a circuit arrangement comprising a thermionic valve having control electrodes each capable of independently controlling the electron stream of said valve, an untuned output circuit and means for applying the same signal waveform to said electrodes so that there is set up in said output circuit a component having an instantaneous amplitude substanatially proportional to the square of the instantaneous amplitude of said signal waveform.

It is well known in radio receivers of the superheterodyne type to employ so-called "mixer" circuits which usually employ a valve of the hexode type to one control electrode of which carrier wave oscillations are applied whilst to another control electrode local oscillations of a different frequency from that of the carrier wave are applied, the anode of the valve having a circuit which is tuned so as to select from the mixed oscillations desired intermediate frequency signals. The present invention is distinguished from such circuits in that the signal waveforms which are applied to the two control electrodes in the circuit of the present invention have the same waveform and frequency and moreover by the term "untuned output circuit" is meant an output circuit which is such that it is capable of responding to those frequencies which are necessary in order to set up a component which is substantially proportional to the square of the instantaneous amplitude of the applied signal.

Said signal waveform may be applied to said control electrodes in the same or different relative proportions with, if desired, one of said waveforms negative with respect to the other so as to set up in said output circuit an output waveform which is equal to the square of the instantaneous amplitude of the signal waveform applied to said control electrodes or an output waveform which has a component proportional to the square of the instantaneous amplitude of said waveform applied to said control electrodes together with a component proportional to the instantaneous amplitude of the signal waveform applied to one of said control electrodes.

In order that the said invention may be clearly understood and readily carried into effect the same will now be more fully described with reference to the accompanying drawings, in which:

Figure 1 illustrates a circuit arrangement according to one embodiment of the invention, Figure 2 illustrates graphically signal waveforms set up in the circuit of Figure 1, Figure 3 illustrates a circuit arrangement according to another embodiment of the invention, Figure 4 illustrates graphically signal waveforms set up in the circuit of Figure 3, and Figure 5 illustrates a circuit arrangement according to another embodiment of the invention.

In the drawings like components of the circuits shown are given the same reference numerals throughout the several figures.

Referring to Figure 1, the circuit comprises a valve 1 of the hexode type having first and second control electrodes 2, 3 arranged to control the common electron stream to the anode 4 of the valve. Input signals from a source not shown are fed to the primary winding 5, of a transformer 6. Across the secondary winding 7 of the transformer are connected two resistances 8 and 9 in series, the junction between the two resistances being earthed as shown. Signals of the same waveform and frequency are fed from the secondary winding 7 to the control electrode 2 of the valve 1 from a tapping point 10 on resistance 9 and to the control electrode 3 as shown. Said signals are fed via coupling condensers 11 and 12, leak resistances 13 and 14 being provided as shown connected to a potentiometer 15 arranged across a source of bias potential 16.

The anode 4 of the valve 1 is connected to a potential source 18 through an untuned output circuit comprising a load resistance 17, output signals being set up across said resistance 17. A resistance 19 is connected between the cathode of the valve 1 and ground to introduce de-generation with a view to improving the linearity of the characteristic of the valve 1.

The operation of the circuit according to Figure 1 will now be described.

If it is assumed that both the control electrodes 2 and 3 have linear amplification characteristics and that the load 17 in the anode circuit of valve 1 has a value negligible compared with the internal impedance of the valve, then it can be said that if the control electrode 3 is maintained at a constant potential by dis-connecting it from the signal source, the instantaneous anode current will be given by the equation $$i_2 = i_0 \ (1 + k_2 V_{g2}) \quad (1)$$

where $i_2$ is the instantaneous value of anode current, $i_0$ is the instantaneous value of anode current in the absence of signals, $k_2$ is the effective mutual conductance of the control electrode 2, and $V_{g2}$ is the instantaneous value of the signal at the control electrode 2.

If, on the other hand, the signal is applied to the control electrode 3, and not to the control electrode 2, then $$i_3 = i_0 \ (1 + k_3 V_{g3}) \quad (2)$$

where $i_3$ is the instantaneous value of anode current, $i_0$ is the instantaneous value of anode current, in the absence of signals, $k_3$ is the effective mutual conductance of the control electrode 3, and $V_{g3}$ is the instantaneous value of the signal at the control electrode 3.

It follows, therefore, that if signals are applied to both control electrodes simultaneously, since each controls the electron stream controlled by the other, the instantaneous value of anode current will be given by the equation, $$i = i_0 \ (1 + k_2 V_{g2}) \ (1 + k_3 V_{g3}) \quad (3)$$

If the tapping point 10 on the resistance 9, is arranged such that $$\frac{V_{g2}}{V_{g3}} = -\frac{k_3}{k_2} \quad (4)$$

the Equation 3 becomes $$i = i_0 (1 + k_2 V_{g2}) \left(1 - k_3 \frac{k_2}{k_3} V_{g2}\right) \quad (5)$$

that is $$i = i_0 \ \{(1 - (k_2 V_{g2})^2\} \quad (6)$$

which represents a relation between instantaneous amplitude of the anode current of valve 1 and the instantaneous amplitude of the input signals of the form required. This is illustrated by way of example in Figure 2 where the input signals $V_{g2}$ and $V_{g3}$ applied respectively to the control electrodes 2 and 3 are of sawtooth form, and it will be seen that the anode current variation $i$ takes the form of two parabolae the ratio of whose latus recta is equal to the square of the inverse ratio of the slopes of the corresponding portions of the sawtooth input signals. The signals applied to the electrodes 2 and 3 are of the same waveform and frequency and have the same phase, although the signals applied to the electrode 3 are the inverse of the signals applied to the electrode 2. Also, the amplitudes of the signals are so proportioned that the valve 1 conducts to produce an output throughout substantially the whole cycle of the applied waveform. If desired in order to reduce the amplitude of the peaks which occur at the ends of the parabolic waveform shown in Figure 2 a small condenser 19a may be shunted across the resistance 19.

In the embodiment shown in Figure 3, the input signal is applied to the control electrode 2 of the valve 1, the transformer and the resistances 8 and 9 being omitted. The control electrode 3 is held at a constant potential relative to earth by the biassing resistance 14 and decoupling condenser 19. A resistance 20 between the cathode of the valve 1 and earth is provided of such a value that the signal applied to the control electrode 2 is so repeated at the cathode of the valve that the voltage, appearing effectively between the control electrode 3 and the cathode, bears the relationship to the voltage appearing between the control electrode 3 and the cathode that is required to satisfy the Equation 4, in order that the desired output can be obtained.

Figure 4 illustrates, by way of example, the anode current variation $i$ set up when a sawtooth waveform $V_{g2}$ is applied to the control electrode 2 and when the cathode resistance 20 is proportioned to set up the waveform shown at $V_k$.

The arrangement according to Figure 3 has an advantage over that of Figure 1, in that it avoids the use of the transformer 1, which tends to introduce undesirable phase shift in the event of the input signal containing components of high frequency.

In the arrangement described with reference to Figures 1 and 3 of the drawings the signal amplitudes applied to the two control electrodes are so chosen relatively to one another that an applied waveform is transformed with accuracy into the square of the waveform. Thus, an applied potential V is transformed into a potential proportional to $V^2$, this result being achieved when the circuit is adjusted so that Equation 4 is satisfied, the circuit working in accordance with Equation 3. In a further embodiment of the invention as shown in Figure 5 a similar circuit is employed but it is arranged that the output waveform is not merely proportional to $V^2$ but consists of two components, one proportional to $V^2$ and the other proportional to V. Such a circuit is useful for generating from a sawtooth potential a waveform composed of a sawtooth component and a parabolic component as is sometimes required in television. As shown in Figure 5 of the drawings, a signal waveform, such as a sawtooth waveform, is applied to the control electrodes 2 and 3 of the valve 1 via a potentiometer 21, the inner control electrode 2 being connected to an adjustable tapping point 22 on the potentiometer whilst the outer control electrode 3 is connected to a fixed tapping point 23 on the potentiometer. The valve 1 in Figure 5 has a cathode resistance 19 which functions in a manner like the resistance 20 described above in connection with Figure 3. If the tapping point 22 is raised above the fixed tapping point 23 the voltage applied to the outer control electrode 3 is reversed in sign compared with the voltage applied to the inner control electrode 2 and a positive sawtooth applied voltage will set up in the output circuit of the valve a sawtooth voltage having a convex curvature, i. e., the output voltage will comprise a positive linear component and a square component of negative sign. If the tapping point 22 is moved below the fixed tapping point 23 a positive applied voltage will set up in the output circuit of the valve a sawtooth voltage having a concave curvature, i. e., the output voltage will comprise a positive linear component and a square component of positive sign.

Although a hexode valve 1 is shown in Figures 1 and 3, it will be understood that any other suitable valve having two control electrodes arranged to control independently the common electron stream of the valve could be used.

I claim:

1. A circuit arrangement comprising a thermionic valve having an output electrode and two pairs of control electrodes, an electrode of each pair being a common cathode of said valve, said pairs of control electrodes being each capable of independently controlling the electron stream of said valve, an untuned output circuit connected to said output electrode, a source of signal waveform, means for applying signals from said source to one of said pairs of control electrodes, and means for applying signals of the same waveform, frequency and phase to the second pair of control electrodes but in inverse sense to the signals applied to said first-mentioned pair to effect individual independent control on said electron stream with the amplitude of said signals and the biassing of said electrodes proportioned to afford continuous conductivity of said valve throughout substantially the whole cycle of the applied waveform and to set up in said output circuit a component having an instantaneous amplitude substantially proportional to the square of the instantaneous amplitude of said signal waveform.

2. A circuit arrangement comprising a thermionic valve having an output electrode and two pairs of control electrodes, an electrode of each pair being a common cathode of said valve, said pairs of control electrodes being each capable of independently controlling the electron stream of said valve, an untuned output circuit connected to said output electrode, a source of signal waveform, means for applying signals from said source to one of said pairs of control electrodes, and means including a common cathode resistance to apply signals of the same waveform, frequency and phase to the second pair of control electrodes but in inverse sense to the signals applied to said first-mentioned pair to effect individual independent control on said electron stream with the amplitude of said signals and the biassing of said electrodes proportioned to afford continuous conductivity of said valve throughout substantially the whole cycle of the applied waveform and to set up in said output circuit a component having an instantaneous amplitude substantially proportional to the square of the instantaneous amplitude of said signal waveform.

References Cited in the file of this patent

UNITED STATES PATENTS

| Number | Name | Date |
|---|---|---|
| 2,190,504 | Schlesinger | Feb. 13, 1940 |
| 2,436,891 | Higinbotham | Mar. 2, 1948 |
| 2,441,387 | Berger | May 11, 1948 |
| 2,535,257 | Berger | Dec. 26, 1950 |
| 2,568,099 | Townsley | Sept. 18, 1951 |